June 24, 1941.  P. TAKÁCS  2,247,104
PHOTOGRAPHIC ROLL FILM CAMERA
Filed Aug. 20, 1938    3 Sheets-Sheet 1
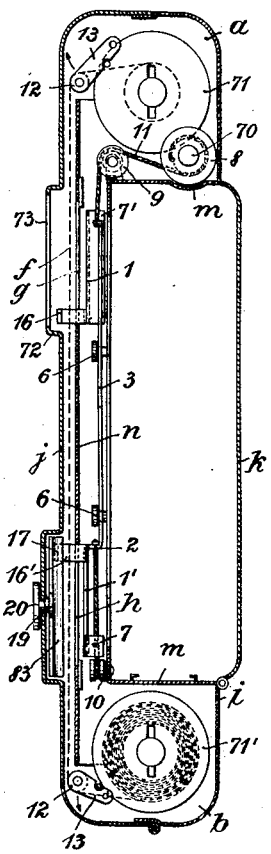
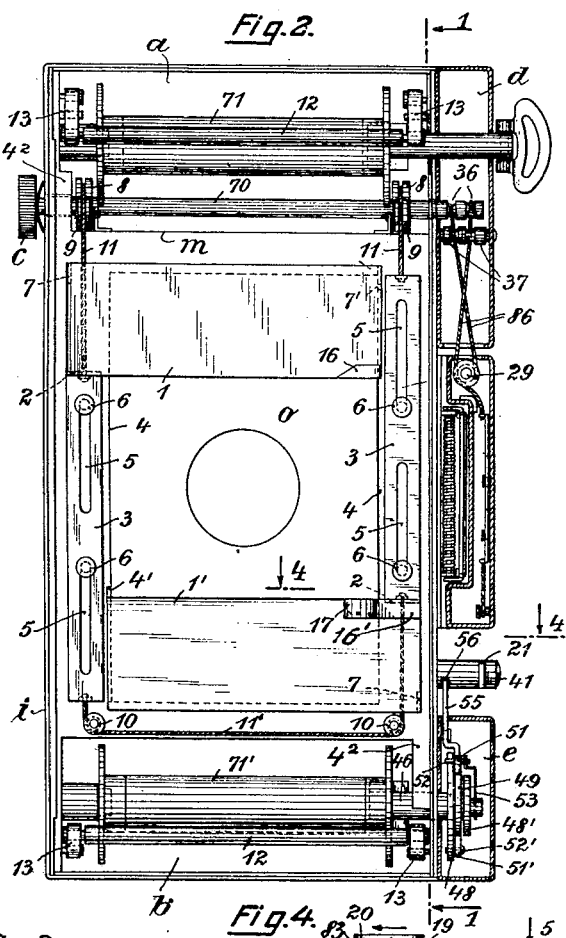
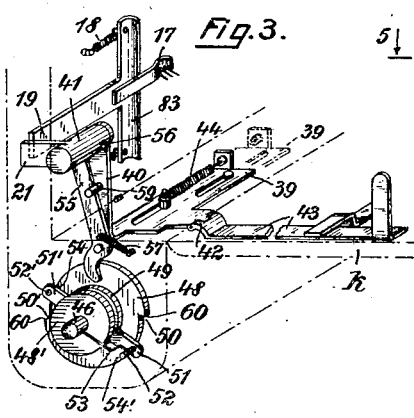
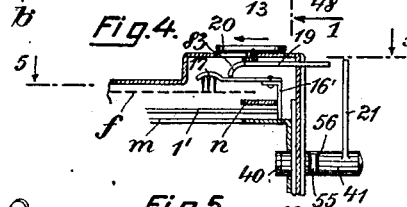
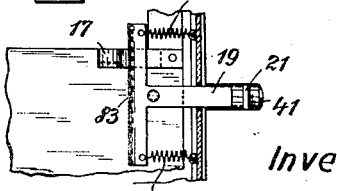
Inventor
Peter Takács
By Frank Reinhard
Attorney June 24, 1941. P. TAKÁCS 2,247,104
PHOTOGRAPHIC ROLL FILM CAMERA
Filed Aug. 20, 1938 3 Sheets-Sheet 2
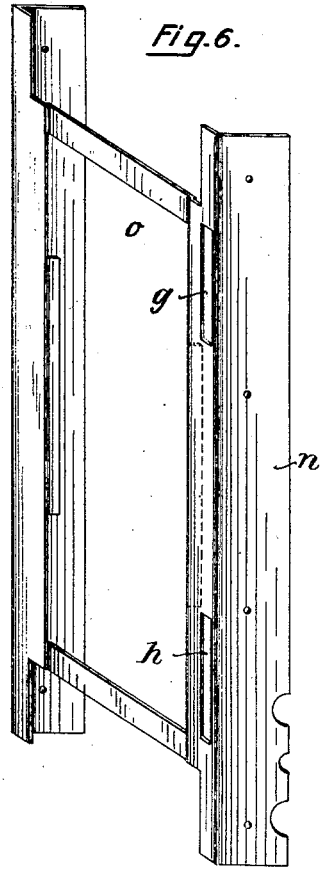
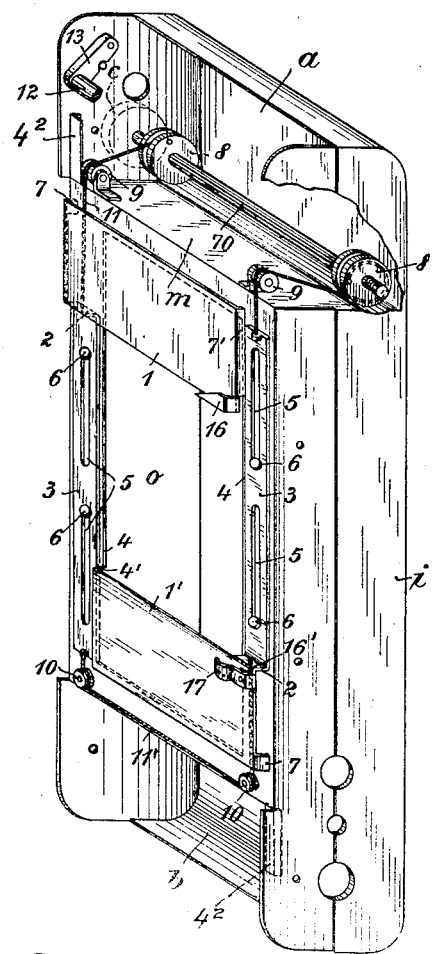
Inventor
Peter Takács
By Franz Tleichold
Attorney

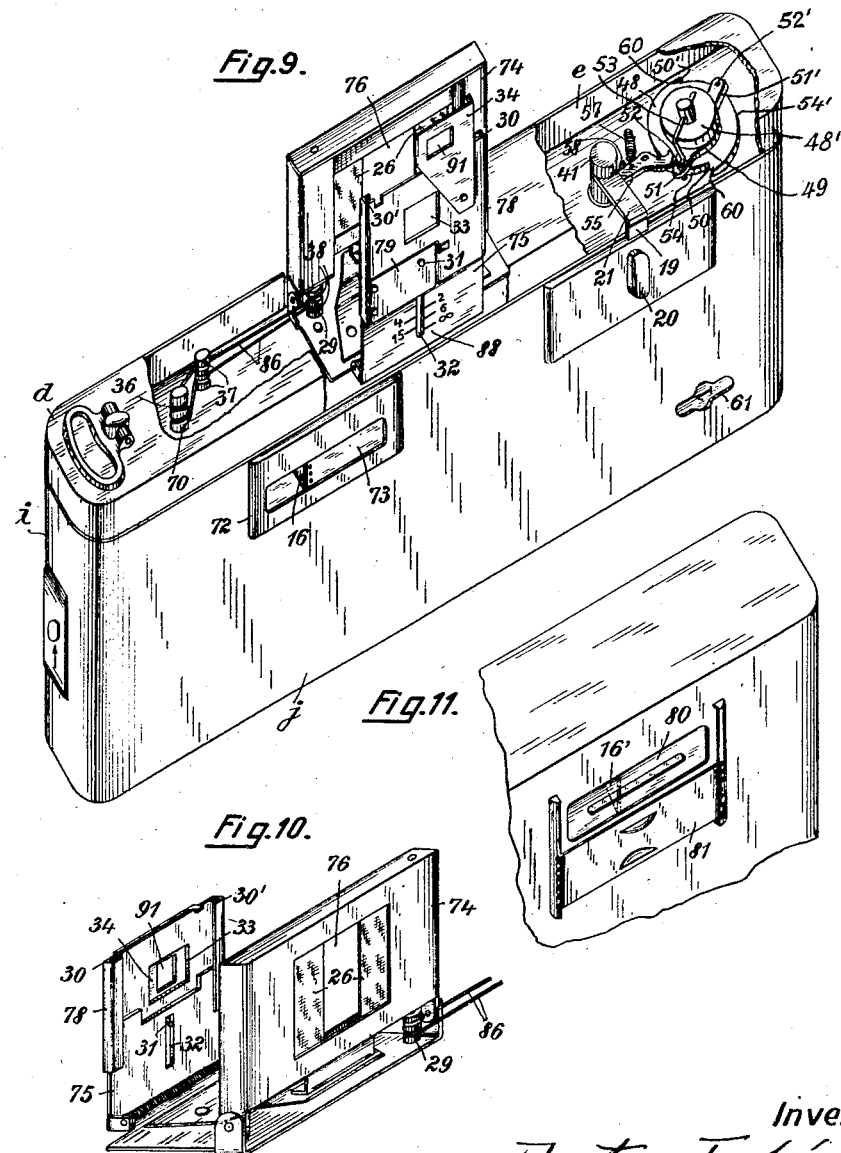

UNITED STATES PATENT OFFICE 2,247,104

PHOTOGRAPHIC ROLL FILM CAMERA

Peter Takács, Budapest, Hungary, assignor to Voigtlander & Sohn Aktiengesellschaft, Brunswick, Germany, a joint-stock company of Germany Application August 20, 1938, Serial No. 225,895
In Hungary February 24, 1937

4 Claims. (Cl. 95—31)

My invention relates to improvements in photographic roll film cameras, and more particularly in cameras of the type in which the size of the exposing aperture and the aperture of the view finder may be varied by means of movable screens. One of the objects of the improvements is to provide a camera of this type in which the said screens for the exposing aperture and the said screens of the view finder are coupled with each other so that the size of the exposing aperture always corresponds to the section of the image viewed through the view finder. Thus the exposing aperture may be reduced to the desired size and set into the position corresponding to the desired portion of the scene by viewing through the view finder. Another object of the improvements is to provide a camera of the type indicated in which the means for operating the said screens controlling the exposing aperture and the aperture of the view finder require little space, and with this object in view my invention consists in constructing the said operating means in the form of a rope gearing of the construction described hereinafter.

Another object of the improvements is to provide means for indicating the ends of the selected portion of the exposing aperture on the exposed film, which means are operated by the shutter release. In a modification the body of the camera is constructed so that the said marks may be made on the film backing paper by means of a pencil or the like through the rear wall of the said body.

Another object of the improvements is to couple the shutter release with the film feeding mechanism in such a way that after each exposure the film must first be fed before the shutter release can again be operated, and with this object in view my invention consists in providing locking means for the shutter release which are adapted to be released by the film winding mechanism.

Other objects of the improvements will appear from the following description.

For the purpose of explaining the invention an example embodying the same has been shown in the accompanying drawings in which the same reference characters have been used in all the views to indicate corresponding parts. In said drawings—

Fig. 1 is a sectional elevation of the camera taken on the line 1—1 of Fig. 2,

Fig. 2 is a rear elevation of the camera partly in section and showing the body of the camera open to show the screens for the exposing aperture, the operating mechanism therefor, and other parts, Fig. 3 is a perspective view showing the shutter release lever, the locking mechanism therefor, and the releasing mechanism therefor, the body and base board of the camera being indicated in dotted lines, Fig. 4 is a fragmentary sectional plan view taken on the line 4—4 of Fig. 2 and showing the mechanism for marking one of the ends of the exposing aperture, Fig. 5 is a sectional elevation taken on the line 5—5 of Fig. 4, Fig. 6 is a perspective view of a frame fitted within the body of the camera and formed with the exposing aperture, Fig. 7 is a perspective rear view of the camera with the rear part of the body of the camera removed for showing the screens for the exposing aperture and its operating mechanism, Fig. 8 is an elevation showing the view finder and its screens, Fig. 9 is an elevation viewed from the rear side and showing the camera with its side members horizontal and the view finder in operative position, Fig. 10 is a perspective view viewed from the front side of the camera and showing the view finder, and Fig. 11 is a detail perspective view showing a modification.

In the example shown in the figures the body of the camera comprises two parts $i$ and $j$. The front part $i$ which carries hinged to it the base board $k$ is pressed inwardly at $m$, and it is formed with an aperture for the passage of the light rays therethrough. Within the part $i$ a frame $n$ is fitted which contains the exposing aperture $o$. The inwardly pressed portion $m$ provides spool chambers $a$ and $b$.

The exposing aperture $o$ is adapted to be reduced in size by means of two screens $l$ and $l'$ located at the front side of the frame $n$ and the exposing aperture. The inner edges of the said screens are cranked forwardly at opposite sides, as is shown at 2, and the said cranked portions are made integral with rails 3 which are formed with longitudinal slots 5 guided on pins 6 fixed to flanges 4 of the portion $m$ of the front part $i$ of the body of the camera. The lateral edges of the screen $l$ are bent forwardly to form an ear 7 and a rib 7' which are in sliding engagement with the flanges 4. At the front side of the lower screen $l'$ one of the flanges 4 is formed with a rib 4', and at the opposite side the said screen $l'$ is formed with an ear 7. The screen 1' slides with its front face and its ear 7 respectively on the said rib 4' and the flange 4. The ribs 4' are provided with extensions 4² on which the the ears 7 are guided when the shutters 1 and 1' are retracted outwardly.

In a modification in lieu of the rib 7' of the upper screen 1 a rib similar to the rib 4' may be provided on the flange 4.

For moving the shutters in opposite directions rope pulleys and strings are provided. As shown, rope pulleys 8 are fixed to a common shaft 70 mounted in the side walls of the front part i of the body and carrying a milled button c at its outer end. Respectively above and below the exposing aperture pairs of rollers 9 and 10 are provided on the portion m. On the said pulleys 8 and on the rollers 9 strings 11 are trained which are fixed to the upper ends of the rails 3. On the rollers 10 a string 11' is trained which is fixed to the bottom ends of the rails 3. The upper strings 11 are trained on the pulleys 8 in opposite senses, as is best shown in Fig. 7, and they are fixed to the said pulleys. If the shaft 70 is turned in clockwise direction, as viewed in Fig. 7, the left hand string 11 pulls the upper screen 1 in upward direction, and such upward movement is transmitted through the string 11' to the lower screen 1' which therefore is pulled downwardly, the right hand string 11 being unwound from the pulley 8 by the clockwise rotary movement of the shaft 70. Thus the screens enlarge the exposing aperture. As the screens have equal movements the center of the exposing aperture bounded thereby is always located in the optical axis of the camera.

At the ends (Figs. 2 and 7) of the adjacent right hand edges of the screens 1 and 1' noses 16 and 16' are provided which extend rearwardly therefrom and pass through slots g and h made in the frame n. The upper nose 16 is bent laterally and formed with a point, and its bottom edge exactly corresponds to the bottom edge of the screen 1, and (when the camera is assembled and changed) it is located at the rear of the film and its backing paper. Thus the said laterally bent portion of the nose 16 provides a hand which may be inspected through an elongated window 73 made in a projecting portion 72 of the rear wall of the body j, the said window being closed by red glass and permitting the hand 16 to be seen from without. Thus the position of the hand 16 indicates the position of the upper edge of the portion of the film which is to be exposed.

The lower nose 16' may likewise be in the form of a hand the upper edge of which corresponds in position to the upper edge of the screen 1', and at the rear of the said nose 16' the rear wall of the part j may be formed with an open slot 80 adapted to be closed by a lid 81 and permitting the lower edge of the exposed portion of the film to be marked on the backing paper by means of a pencil, as is shown in Fig. 11.

In the construction shown in Figs. 2, 4, 5 and 7, to the said nose 16' a leaf spring 17 is secured which has a few prongs fixed thereto, and which is bulged rearwardly. The said spring is adapted to be depressed for punching the film or the backing paper thereof. As shown, the said prongs are slightly spaced downward from the upper edge of the screen 1', so that the successive film sections are spaced from one another when the film is fed upwardly and with the holes made in the backing paper visible behind the hand 16. For operating the punching prongs a slide 19 is provided which carries an arm 83 disposed longitudinally of the camera. To the said slide a button 20 is fixed which projects outwardly through the rear wall of the body of the camera. Springs 18 are provided for retracting the slide 19, so that the spring 17 retracts the prongs from the film when the slide 19 is returned into initial position.

In lieu of or in addition to the hand operated button 20 means connected with the shutter release may be provided for moving the slide 19, which for this purpose are connected with an arm 21. This modification will be described hereafter.

By having the slide 19 mounted in the part j of the body and out of positive connection with the spring 17 it is carried along by the part j being opened without being interfered with by the indicating device. The arm 83 of the slide 19 permits punching of the film backing paper in any position of the screen 1'.

The film winding spool 71 is mounted within the chamber a, and the film delivering spool 71' within the chamber b. Guide rollers 12 for the film f are rotatably mounted on arms 13 and arms 13 are pivotally mounted on the front part i of the body. Thus, when the camera has been opened the said rollers may be retracted rearwardly, so that the spools 71, 71' are readily accessible.

In Figs. 8, 9 and 10 I have shown the view finder which is likewise provided with means for varying the section of the scene viewed therethrough. For this purpose screens 26 are provided the construction and operation of which are similar to the construction and operation of the screens 1, 1'.

In describing the view finder reference will be made to Figs. 8, 9 and 10 in which the camera has been placed with its longitudinal sides horizontal, because in this position the view finder is best shown.

The view finder consists of two plates 74 and 75 which as shown in Fig. 9 are hinged to the top wall of the body of the camera. The plate 74 is provided with a rectangular aperture 76 which can be enlarged or reduced in size by means of the said transversely movable screens 26 which are formed respectively at their top and bottom sides with rails 26' formed with slits 24 guided on pins 25. To the said rails strings 28 are fixed, which are trained in opposite senses on a grooved roller 23, the said strings being fixed to the said roller. To the opposite ends of the rails 26' a string 28' is fixed which is trained on pins 27.

The roller 23 is connected with a roller 29 having two circumferential grooves 38 by means of which it is driven from the shaft 70 on which the pulleys 8 are mounted. The shaft 70 is extended through one of the side walls of the body of the camera (as viewed in Fig. 2) and into a casing d, and the said projecting end is provided with two circumferential grooves 36. Within the said casing d two grooved guide rollers 37 are mounted. Within the grooves 38 the ends of strings 86 are fixed which are trained on the roller 29 in opposite senses, and the said strings 86 are trained in the grooves in roller 37. The strings are fixed to the shaft 70 and they are trained on the grooves 36 in opposite senses. Thus when the shaft 70 is turned in clockwise or anticlockwise direction the said rotary movement is transmitted to the screens of the view finder, the ratio of the movement of the said screens and the screens 1, 1' corresponding to the ratio of the diameters of the various pulleys. Any change in the relative positions of the screens of the view finder and the exposing aperture is impossible, because the strings 86 are fixed to the roller 29 and the shaft 70.

The rear plate 75 of the finder has a plate 78 slidably mounted thereon which is provided with guide ways 30, 30', and a conical pin 31 carried by a leaf spring 79 projects into a slot 32 of the plate 75 and holds the plates 75 and 78 in frictional engagement. By shifting the slide 78 the aperture 33 of the said plate may be shifted for compensating parallax. For setting the plate 78 with its aperture 33 into correct position scale marks 88 are provided on the plate 75. The size of the aperture 33 may be reduced by means of a mask 34 having an opening 91, the said mask being pivotally mounted on the plate 78.

The shutter release mechanism is shown in Fig. 3. It comprises a release arm 43 which is hinged at 42 to a slide 39 mounted in the bottom part of the body of the camera, the axis of the hinge 42 being located coaxially of the hinge of the base board k. A spring 44 tends to pull the slide 39 forwardly, as viewed in Fig. 3. The slide 39 carries an upwardly directed arm 40 to which a pin 41 is fixed which projects laterally through the side wall of the body. The release mechanism is operated by exerting pressure on the said pin 41, the said shutter being retracted by the spring 44 when the pin 41 is released. Outside the body of the camera the aforesaid arm 21 is fixed to the pin 41, so that the punching device 17 is operated whenever the release mechanism is operated. Thus it is impossible to forget punching of the film.

Further, the release mechanism cooperates with the film winding mechanism in such a way that operation of the release mechanism is impossible before the film winding mechanism has been operated. This mechanism is shown in Figs. 3 and 9, Fig. 9 showing the locking device for the release mechanism in locking position, while Fig. 3 shows the same in releasing position.

For locking the release mechanism a latch lever 55 is provided which is pivotally mounted on the outside of the side wall of the body of the camera and within a casing e. The said lever is adapted for engagement with a slot 56 made in the pin 41, and it is held in this locking position by a spring 57 tending to hold the lever in engagement with a stop pin 58 shown in Fig. 9.

At one side the lower spool 71' is in loose engagement with a short shaft 46 projecting from the body of the camera into the casing e, and to the said shaft spaced disks 48 and 48' are fixed between which a third disk 49 is rotatably mounted. The disk 48 is formed at opposite sides with marginal cut-out portions 50, 50'. The disk 49 is made integral with two arms 51, 51' which are equipped with pins 52, 52' engaging in the cut-out portions 50 and 50'. The pin 52 is extended outwardly, and it is engaged by a leaf spring 53 fixed to the shaft 46, the said spring tending to turn the disk 49 in clockwise direction, as viewed in Fig. 3, so that the pins 52 and 52' bear on the edges 54 and 54' of the cut-out portions 50 and 50'. The bottom end of the lever 55 is cranked into the path of the arms 51, 51'. To the arm 40 a pin 59 is fixed which is passed outwardly through a bore of the side wall of the body and into position for engagement with the lever 55. In the locking position shown in Fig. 9 the said pin is retracted inwardly and away from the lever 55. When however the lever 55 is turned into the position shown in Fig. 3 in which it is out of engagement with the slot 56, the slide 39 is shifted outwardly together with the pin 59, and the said pin locks the lever 55 in non-locking position. Now the release lever is in operative position.

Starting from Fig. 9, the locking mechanism is operated as follows:

When the film is fed the shaft 46 and the disk 48 are turned in clockwise direction, and the disk 49 is carried along by the spring 53 until one of its arms 51 or 51' engages the downwardly directed arm of the lever 55. The force exerted by the spring 53 is smaller than that of the spring 57, and therefore the disk 49 is now arrested by the lever 55 during the further film feeding movement, until the trailing edge 60 of the cut-out portion 50 or 50' engages the said lever. Now the lever 55 is carried along and turned in anti-clockwise direction (Fig. 3). Thereby the lever is withdrawn from the slot 56 so that the slide 39 is shifted by the spring 44 forwardly and into the position shown in full lines. The pin 59 is in the position shown in Fig. 3, and it locks the lever 55 in releasing position even when it has been released from the arm 51. By the rotary movement of the disk 49 the tension of the spring 53 has been increased and when the arm 51 has moved past the lever 55 the disk 49 is returned by the spring 53 into the original position shown in Fig. 3. Now the release mechanism is in the unlocked position shown in Fig. 3, and the pin 41 may be pressed inwardly. Thereby the slide 39 carrying the release lever 43 is shifted inwardly and into the position shown in dotted lines in which it releases the shutter, and the pin 59 releases the lever 55 which thereupon swings to engagement with the slot 56 in pin 41. This is possible only after the slide 39 and the pin 41 have been pressed forwardly by the spring 44. Now the release mechanism is again locked.

By the operation of the release lever also the rail 19 has been pressed inwardly by the arm 21 so that the prongs 17 punch the film backing paper. When the film is again fed it is arrested when the holes made in the said backing paper by the prongs are visible through the window 73 and behind the hand 16. Thus the section of the film fed is a little larger than the exposing aperture bounded by the screens 1 and 1', and the successive pictures are slightly spaced from each other by a narrow blank strip of film.

By means of the apparatus pictures of different size are made according to the position of the screens 1, 1', and accordingly the shaft 46 is turned through different angles. Therefore unless the arms 51 and 51' are mounted so as to be returned by the spring 53 into initial positions, it may happen that the said arms are left at the end of the film feeding movement in a position in which they are engaged by the latch lever 55 and prevent the same from being returned into locking position. This is prevented in the construction described above as follows: When the arm 51 or 51' has passed the lever 55 it is advanced by the spring 53 relatively to the disk 48 and with the pin 52 (52') into engagement with the leading end wall 54 (54') of the cut-out portion 50 (50'). If at the end of the feeding movement the said arm engages the lever 55, then, on the subsequent operation of the shutter release mechanism, the lever 55 returning into locking position will turn the arm 51 (51') against the action of the spring 53 in anti-clockwise direction, which movement is possible because the pins have play within the cut-out portion 50 and 50'. The number of the arms 51, 51' depends on the size of the pictures to be made. In a camera of the size 6.9 cm. two arms are sufficient even for making pictures of the smallest size.

When the camera is being loaded care must be taken that the film be passed beneath the pins of spring 17 and the hand 16. Thereafter the new film is fed until the first number upon the backing paper of the film appears in the window 61.

The size of the exposing surface is set by means of the view finder through which a portion of the scene is seen which depends on the position of the screens 26, which screens are set into position by means of the milled button c. By the operation of the release lever the end of the exposed portion of the film is marked on the backing paper of the film, and this mark is brought to the hand 16 which is visible through the elongated window 73 (shown in Fig. 9) before the next exposure is made. The length of the portion of the film which has not yet been exposed need be ascertained by calculation only after the number 7 has passed the window 61.

I claim:

1. In a roll film camera, comprising an object lens, a casing formed with an exposing aperture, and film feeding means, the invention herein described which consists of screens movable in a direction parallel to the movement of the film across said aperture for varying the operative size thereof, the screen located at the leading end of the film being fed being provided at the end bounding the exposing aperture and at the rear thereof with a hand substantially corresponding in position to the bounding edge of the screen, a camera casing having its rear wall formed with an aperture through which said hand is visible, and marking means connected with said screen located at the trailing end of the film and nearly corresponding in position to the edge of said screen bounding the exposing aperture.

2. In a roll film camera including an object lens, a casing formed with an exposing aperture, and film feeding means, the invention herein described which consists of a pair of screens movably borne by said casing and defining the leading and trailing edges of such aperture, indicating means borne by the screen that defines the leading edge of such aperture, such means extending when a film is in place in the camera to the rear of the film, marking means borne by the screen that defines the trailing edge of the said aperture, such marking means also extending when a film is in place in the camera to the rear of the film, the said camera casing being formed with a window through which the indicating means first named above are visible, and means extending through the casing for operating said marking means.

3. In a roll film camera, comprising a casing having an exposing aperture, and means for feeding a film across said exposing aperture, the invention herein described which consists of screens movable in opposite directions across said exposing aperture for varying the operative area thereof, a rotary shaft located at one side of said screens, strings trained on said shaft in opposite senses and attached each with one of said screens, a view finder associated with said camera and having a frame formed with an aperture through which a section of the scene to be photographed may be seen, screens movable across said aperture of the view finder for varying the area thereof, a rotary shaft located at one side of said screens of the view finder, strings trained on said shaft in opposite senses and attached one to each of said screens, and a rope gearing connecting said shafts for operating the screens controlling the exposing aperture and the screens controlling the area of said view finder, the diameters of the rotary members on which said strings are trained being such that the area bounded by said screens on the exposing aperture corresponds to the area through which the scene is seen through said view finder.

4. In a roll film camera that includes a casing and means for feeding a length of film through a planar course from a delivery spool to a winding spool, the invention herein described of means for varying the aperture of exposure through which the film in its planar course is exposed, such means consisting of two screens, each screen being provided with a rail and the rails of the two screens being borne for longitudinal reciprocation one upon each of the opposite sides of the casing, guiding means borne by said casing and engaging said rails, a cord trained upon sheaves and connecting the two said screens, whereby advance of one of the screens effects corresponding advance of the other and retrogression of the second effects corresponding retrogression of the first, a rotatable member, and several connections between said rotatable member and the rails of said screens, whereby rotation of said member in one directcion effects advance of one of the screens and rotation in the opposite direction effects retrogression of the other of the screens.

PETER TAKÁCS.